(12) United States Patent
Amend et al.

(10) Patent No.: US 8,638,433 B1
(45) Date of Patent: Jan. 28, 2014

(54) VISUAL SPECTROPHOTOMETER

(71) Applicants: John R. Amend, Bozeman, MT (US); Richard A. Hermens, La Grande, OR (US)

(72) Inventors: John R. Amend, Bozeman, MT (US); Richard A. Hermens, La Grande, OR (US)

( * ) Notice: Subject to any disclaimer, the term of this patent is extended or adjusted under 35 U.S.C. 154(b) by 0 days.

(21) Appl. No.: 13/573,485

(22) Filed: Sep. 17, 2012

(51) Int. Cl.
*G01J 3/42* (2006.01)

(52) U.S. Cl.
USPC .......................................................... 356/319

(58) Field of Classification Search
USPC .......................................................... 356/319
See application file for complete search history.

(56) References Cited

U.S. PATENT DOCUMENTS

| | | | |
|---|---|---|---|
| 1,526,504 A | 5/1920 | Rabi | |
| 2,431,734 A | 4/1944 | Cutting | |
| 3,024,693 A | 3/1959 | Harmon | |
| 3,677,649 A | 7/1972 | Miyashita | |
| 3,687,518 A | 8/1972 | Steinhardt et al. | |
| 3,791,737 A | 2/1974 | Johansson | |
| 4,060,327 A * | 11/1977 | Jacobowitz et al. | 356/328 |
| 4,097,152 A | 6/1978 | Kishner | |
| 5,880,832 A * | 3/1999 | Eastman et al. | 356/326 |
| 6,184,985 B1 | 2/2001 | Chalmers et al. | |
| 7,948,620 B2 * | 5/2011 | Christian et al. | 356/319 |

* cited by examiner

*Primary Examiner* — Tu Nguyen
(74) *Attorney, Agent, or Firm* — Richard C. Conover

(57) ABSTRACT

A spectrophotometer including a light tube having a spectrophotometer head mounted to one end of the light tube and a diffraction grating head mounted to the opposite end. The spectrophotometer head having a bore therethrough for receiving incoming light from a light source providing a light path through the spectrophotometer head and light tube; Further, a slit is disposed in the light path and a vial of colored liquid is suspended halfway through the light path. The diffraction grating includes a bore aligned with the light path and includes a focusing lens and a diffraction grating disposed in the light path. The diffraction grating displaying a spectrum with an upper half displaying the spectrum of the light transmitted through the colored liquid and the lower half displaying the spectrum of the light source.

2 Claims, 15 Drawing Sheets

VISUAL SPECTROPHOTOMETER

This application claims the benefit of provisional application Ser. No. 61/574,000 filed Sep. 15, 2011.

BACKGROUND OF INVENTION

The present invention relates to a visual spectrophotometer which provides low-cost visual observation and electronic measurements of visible-region atomic emission and molecular absorption spectra. It is designed for laboratory use in college and high school chemistry laboratories.

SUMMARY OF INVENTION

A spectrophotometer according to the present invention includes an elongate light tube having a spectrophotometer head mounted to one end of the light tube and a diffraction grating head mounted to the opposite end of the light tube. The spectrophotometer head includes a bore therethrough aligned with the light tube for receiving incoming light from a light source providing a light path through the spectrophotometer head and the light tube. A slit assembly is mounted in the spectrophotometer head providing a slit disposed in the light path. A stopped bore is provided in a top well of the spectrophotometer head extending downwardly orthogonal to the light path and stopped halfway through the light path. A transparent vial containing colored liquid is disposed within the stopped bore. The diffraction grating head includes a bore extending therethrough aligned with the light path. A focusing lens is disposed in the light path adjacent the light tube. A diffraction grating is disposed in the light path spaced apart from the lens for displaying a spectrum of the light in the light path with an upper half displaying the spectrum of the light transmitted through the colored liquid and a lower half displaying the spectrum of the light source.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
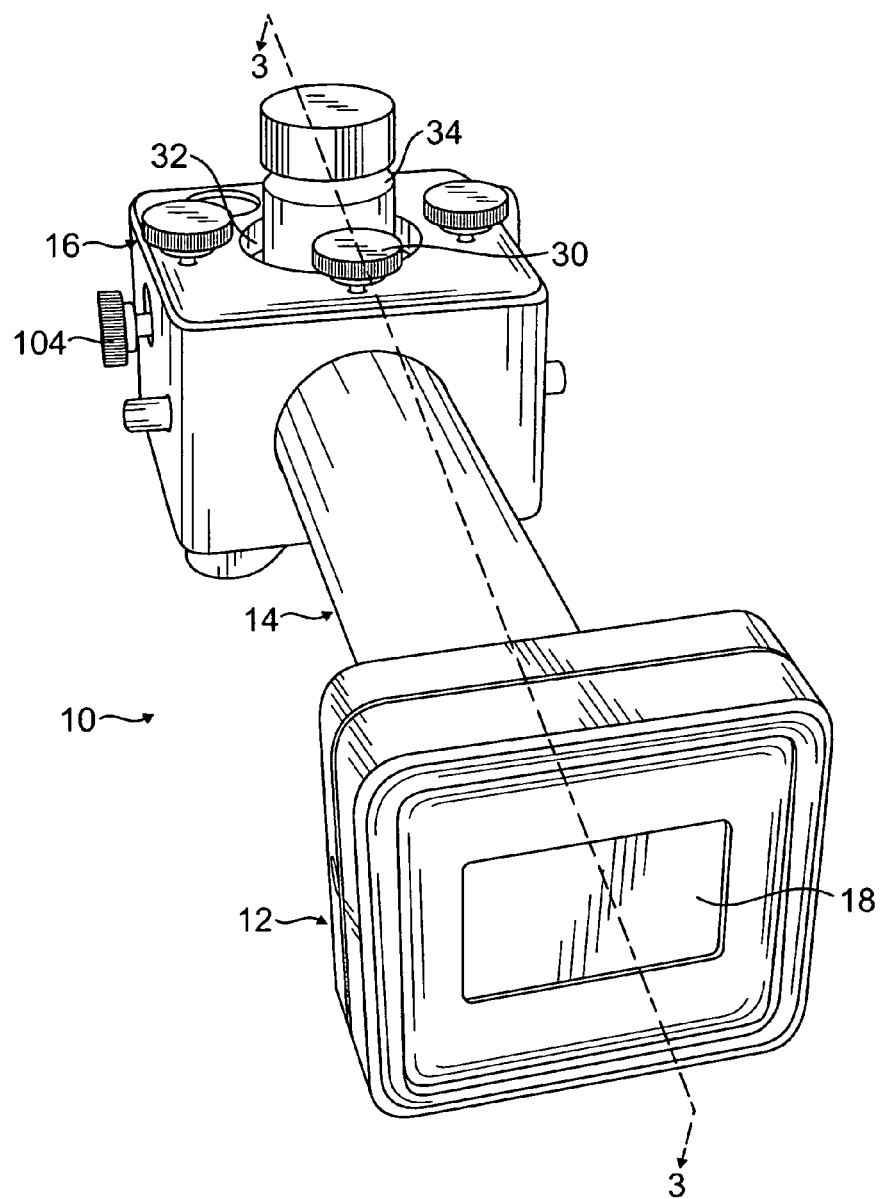
FIG. 1 is a front perspective view of a visual spectrophotometer according to the present invention.
Figure 2:
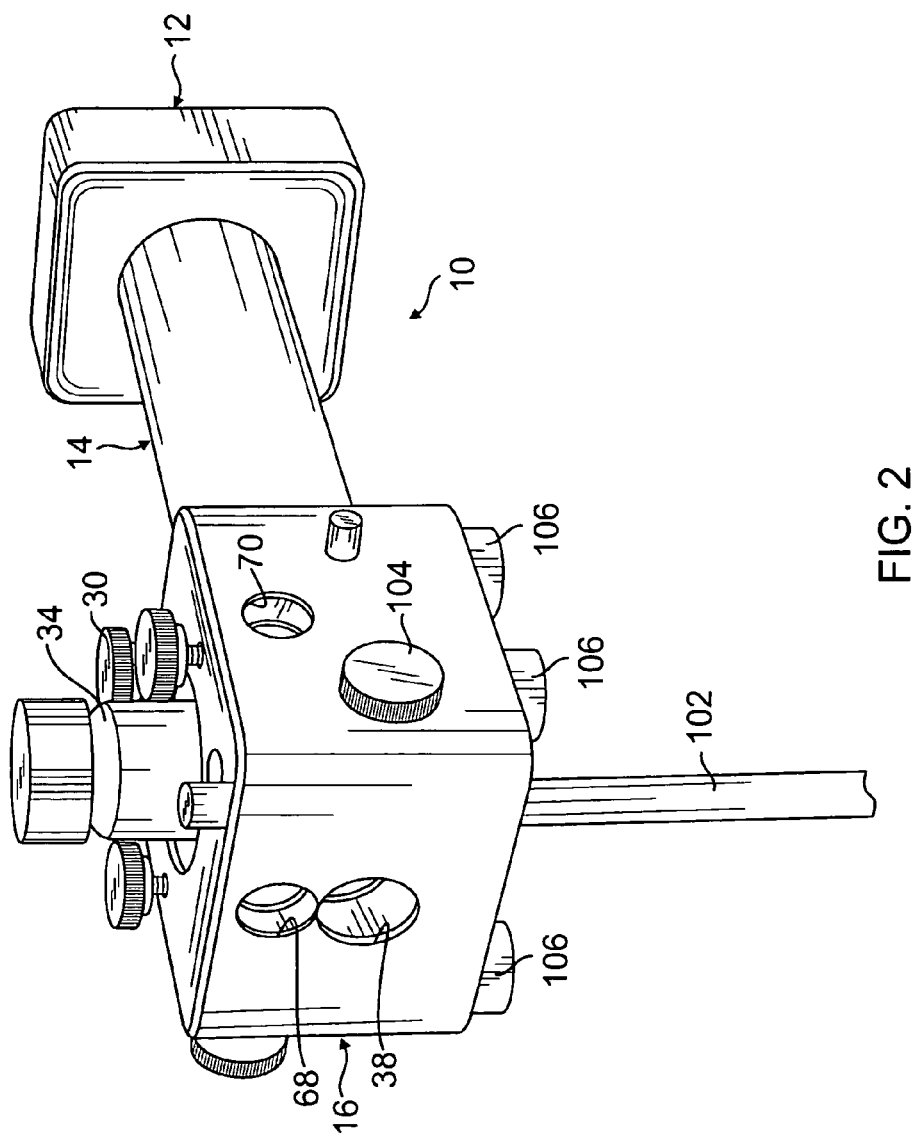
FIG. 2 is a rear perspective view of the visual spectrophotometer shown in FIG. 1 mounted to a ring stand.

A visual spectrophotometer according to the present invention is shown in FIGS. 1 and 2. The visual spectrophotometer 10 includes three components, namely a diffraction grating head 12, a hollow light tube 14 and a spectrophotometer head 16.

Figure 3:
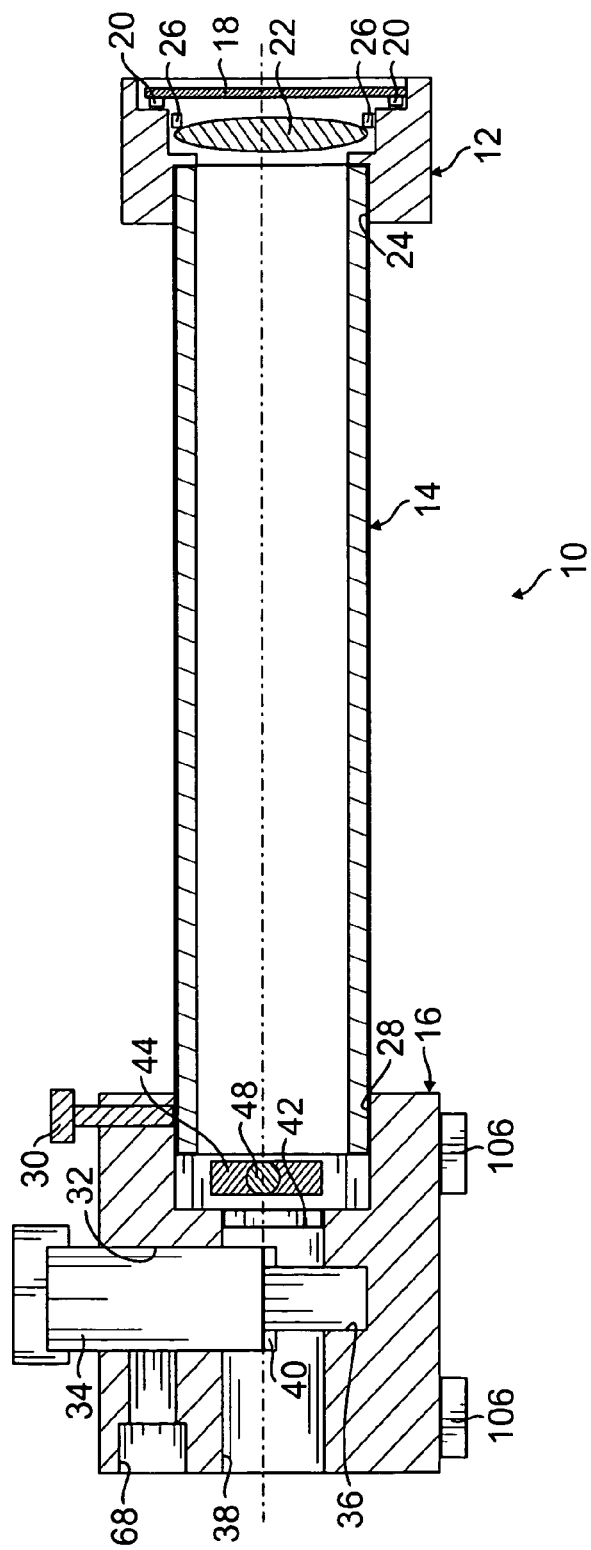
FIG. 3 is a cross sectional view of the visual spectrophotometer taken along the line 3-3 in FIG. 1.

The diffraction grating head 12 is shown in FIGS. 1 and 3. As shown in FIGS. 2 and 3, a diffraction grating 18 is inset into the front face of the mounting head 12 and secured in place with glue 20. Immediately behind the diffraction grating is mounted a lens 22 which is mounted in axial alignment with a stepped bore 24 provided in the rearward face of the diffraction grating head 12. The lens 22 is secured in place with glue 26. The light tube 14 is frictionally inserted in the stepped bore 24. In a preferred embodiment the light tube 14 is provided with a black non-reflecting interior. An open end of light tube 24 coaxially faces the lens 26 as shown in FIG. 3.

The spectrophotometer head 16 is shown in FIGS. 2, 4, 5 and 6. The spectrophotometer head 16 includes a stepped bore 28 for receiving the light tube 14 as shown in FIG. 3. A thumb screw 30 secures the light tube 16 in place.

Figure 4:
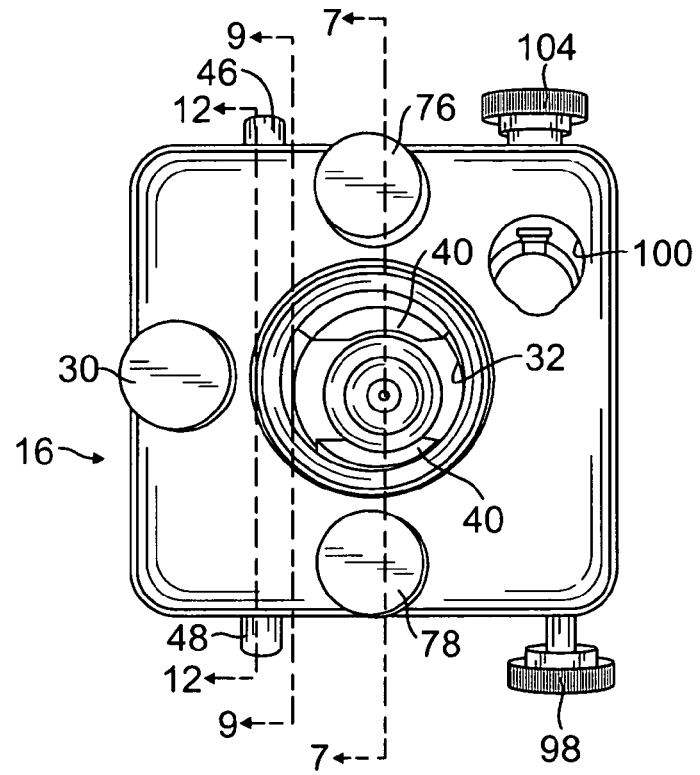
FIG. 4 is a top view of a spectrophotometer head used with the present invention.
Figure 5:
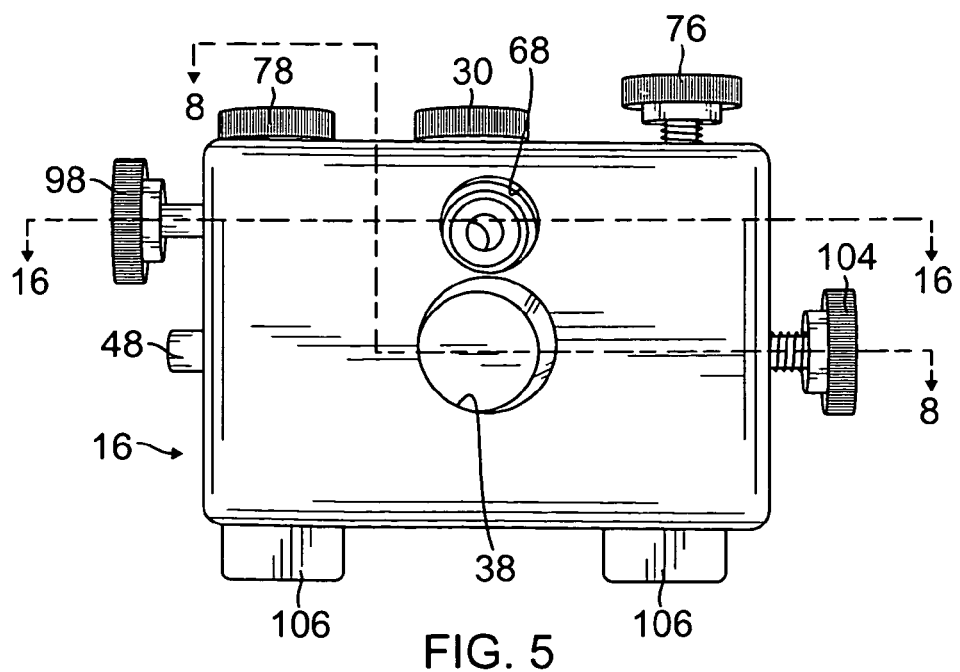
FIG. 5 is a right hand elevational view of the spectrophotometer head shown in FIG. 4.
Figure 6:
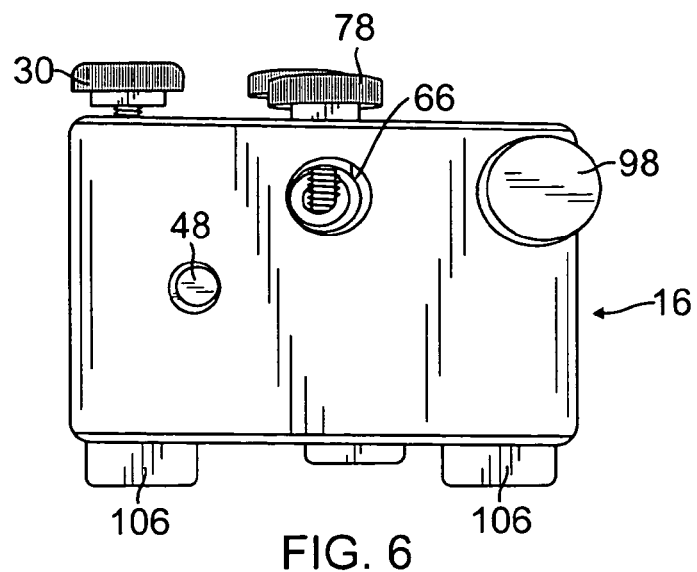
FIG. 6 is a elevational view of the spectrophotometer head shown in FIG. 4.
Figure 7:
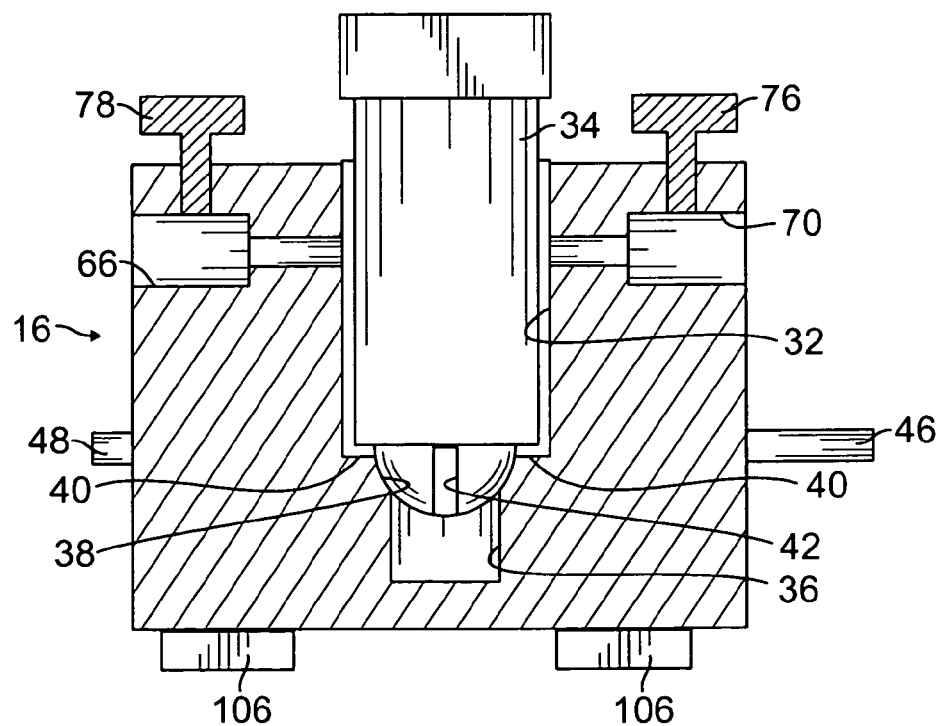
FIG. 7 is a cross sectional view taken along the line 7-7 in FIG. 4.

A stepped bore 32 is provided in the upper surface of spectrophotometer head 16 as shown in FIGS. 3, 4 and 7. The stepped bore 32 is sized to receive a vial 34 as shown in FIGS. 2 and 7.

Figure 8:
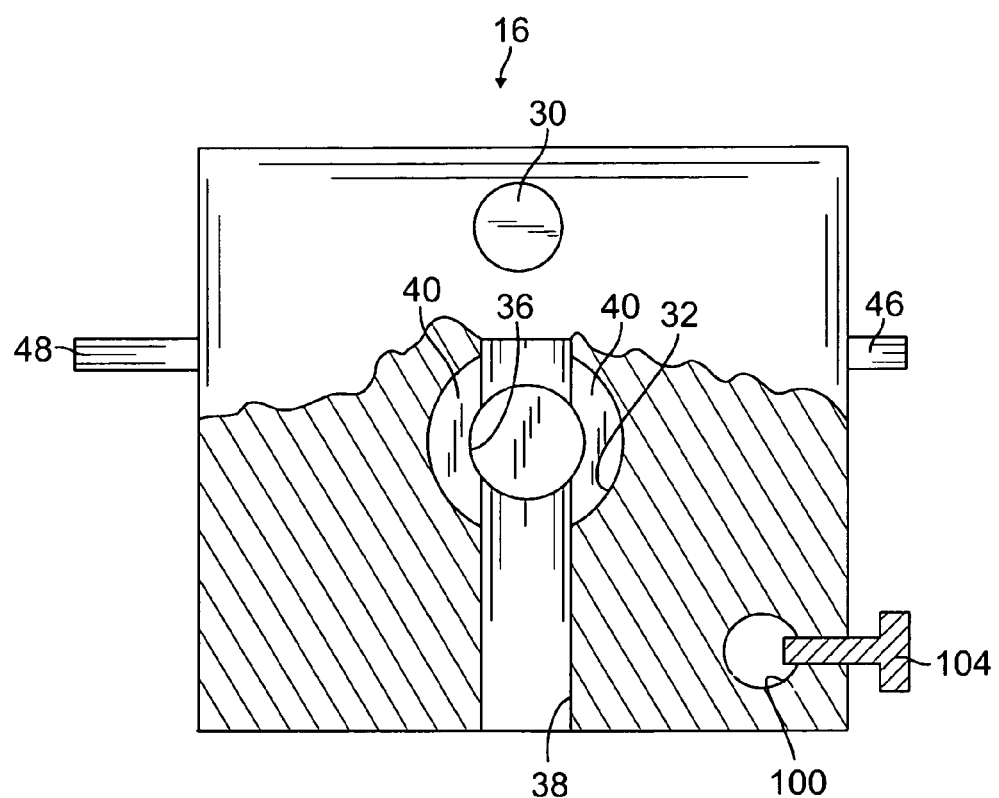
FIG. 8 is a partial cross sectional view taken along the line 8-8 in FIG. 5.

A smaller diameter bore 36 is provided in the spectrophotometer head 16 which is aligned to be coaxial with the bore 32 as shown in FIGS. 7 and 8. A bore 38 is provided in a front face of the spectrophotometer head 16 having a longitudinal axis which intersects in a perpendicular direction the coaxial axis of bores 32 and 36 as shown in FIGS. 2 and 8 and is coaxially aligned with the longitudinal axis of the light tube 14. With this arrangement, a pair of opposed ledges 40 are provided for supporting the vial 34 as shown in FIGS. 7 and 8. Furthermore, as seen in FIG. 7, the longitudinal axis of bore 38 is positioned to align with the ledges 40 so that one half of the bore 38 is above the vial 34 and one half of the bore 38 is below the vial 34.

Figure 9:
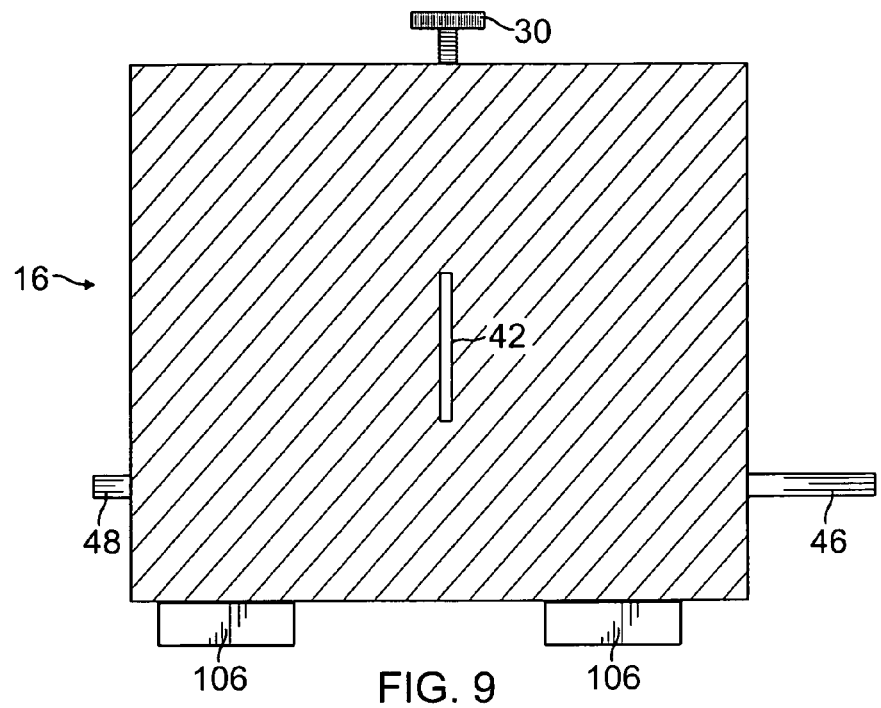
FIG. 9 is a cross sectional view taking along the line 9-9 in FIG. 4.

As shown in FIG. 9, a slot 42 is provided in the body of the spectrophotometer head 16. The longitudinal center line of slot 42 is aligned with the longitudinal axis of light tube 14 as shown in FIG. 3.

Figure 10:
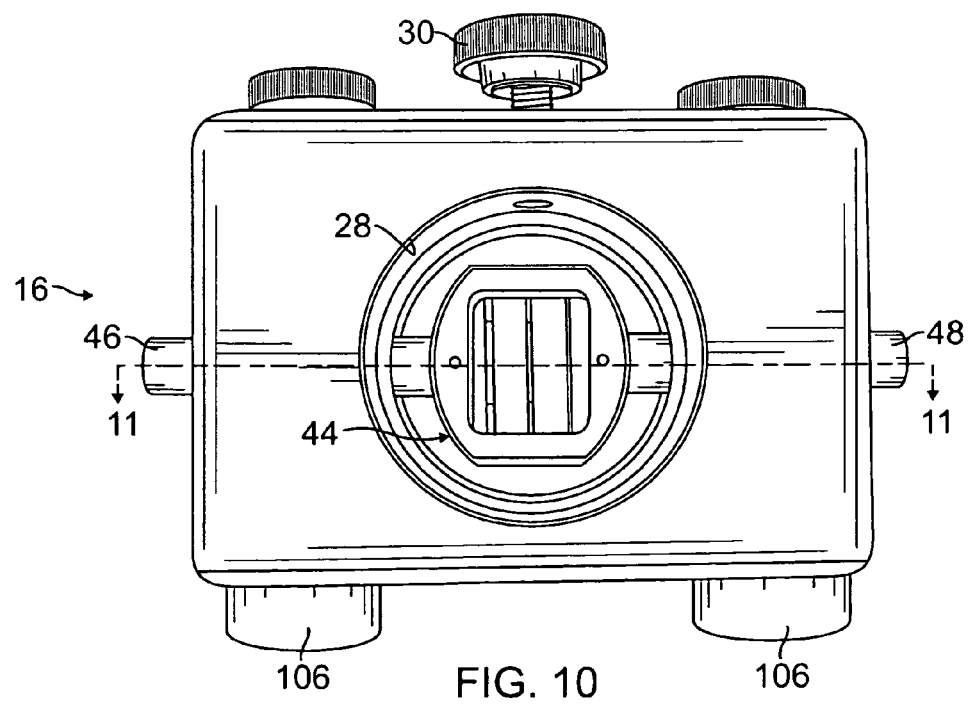
FIG. 10 is a perspective view of the left side of the spectrophotometer head shown in FIG. 4.
Figure 11:
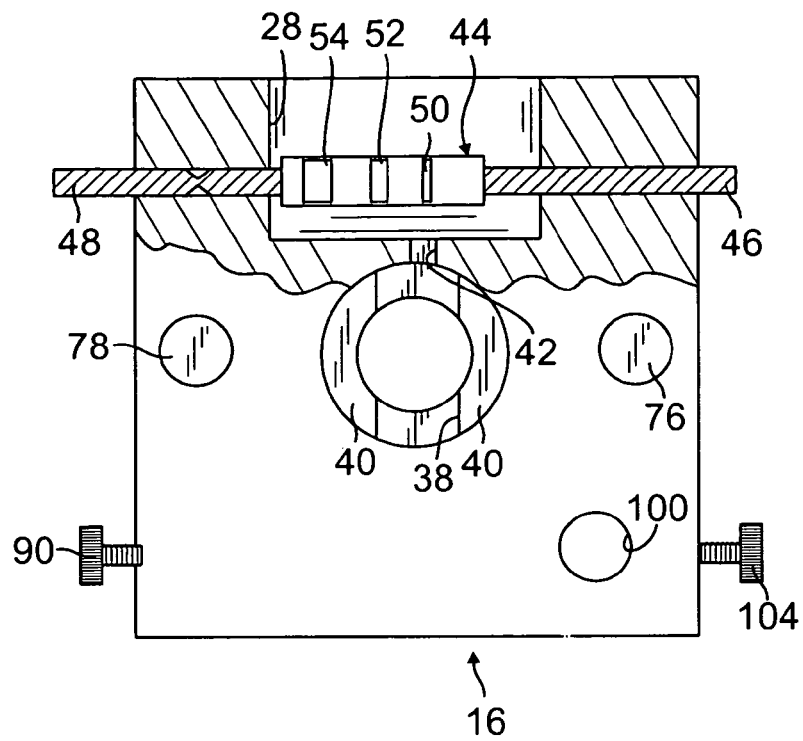
FIG. 11 is a partial cross sectional view taken along the line 11-11 in FIG. 10.

As shown in FIGS. 10 and 11 a multi-slit carrier 44 is slidably mounted in the bore 28 with rods 46 and 48 which are slidably received by corresponding bores in the head 16 as shown in FIG. 11. The carrier 44, in a preferred embodiment, carries three slits 50, 52 and 54 of increased widths. The carrier 44 is dimensioned so that when the carrier 44 is moved to be against the one side of the bore 28 as shown in FIG. 11 with rods 46 and 48, the slit 50 is aligned with the slot 42. When the carrier 44 is moved to the opposite side of the bore 28 as shown in FIG. 11, the slit 54 is aligned with the slot 42.

Figure 12:
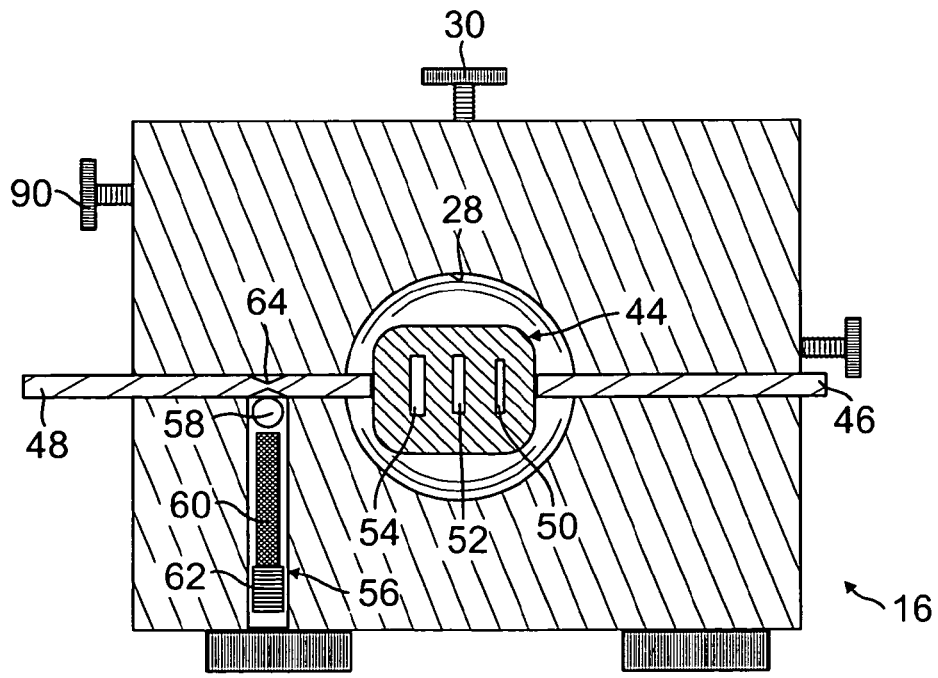
FIG. 12 is a cross sectional view taken along the line 12-12 in FIG. 4.
Figure 13:
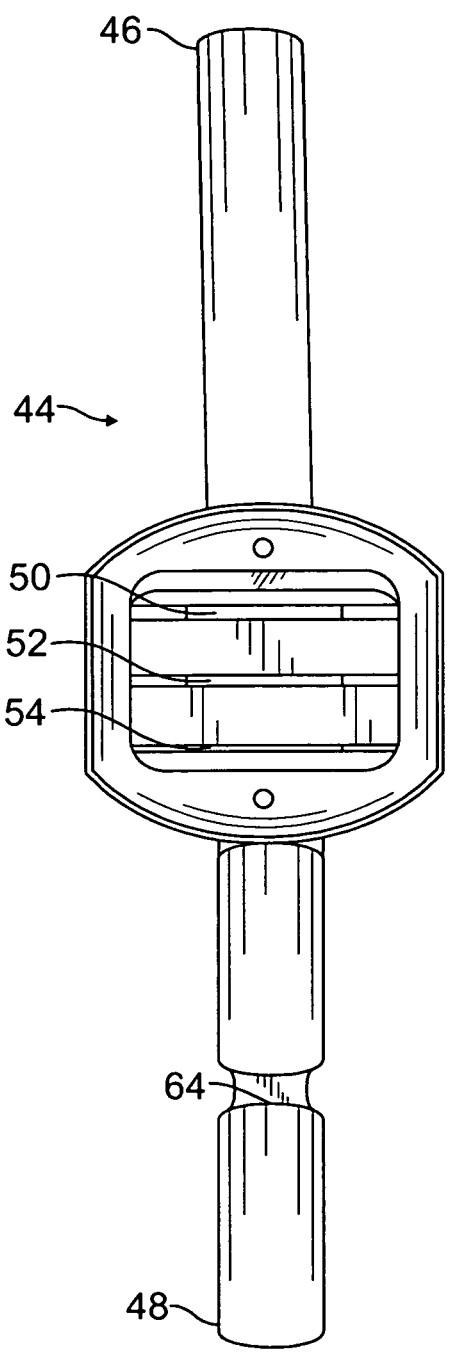
FIG. 13 is a perspective view of a multi-slit carrier used with the present invention.

As shown in FIG. 12, a ball detent device 56 is used to align the slit 52 with the slot 42. The ball detent device includes a ball 58, a spring 60 and an allen screw 62 for securing the ball detent device 56 in place. The ball registers with a notch 64 provided in the rod 48. With the ball 58 in the notch 64, the slit 52 is aligned with the slot 42. The carrier 44 with the rods 46 and 48 is shown in FIG. 13.

Figure 14:
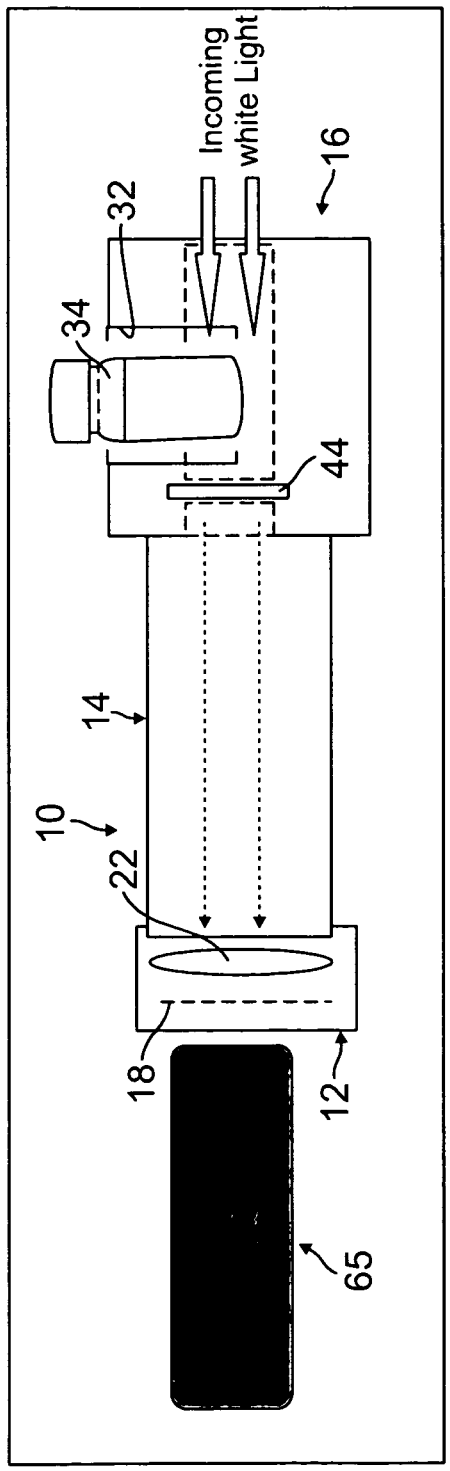
FIG. 14 is a schematic view showing the operation of the present invention.

The operation of the visual spectrophotometer 10 is shown in FIG. 14. A user first inserts a vial 34 of a colored liquid in bore 32. Rod 46 or 48 is then used to align one of the slits 50, 52 or 54 with the slot 42. The wider the slit selected, the brighter the spectrum 65 but the lower the resolution. The user then holds the spectrophotometer head 16 toward a source of white light. The user views a spectrum 65 by viewing through the visual spectrophotometer 10 through the end having the diffraction grating 18. Because the vial 34 containing a colored liquid is suspended in the incoming white light path the spectrum 65 is split in half with the upper half showing a spectrum of the white light transmitted through the colored liquid in the vial 34 and the bottom half shows the spectrum of white light alone. The upper half of light transmitted is known as the "sample beam" and the lower half of the light transmitted is known as the "reference beam." Thus it is easy for a user to visually see the wavelengths being absorbed by the colored liquid in the vial 34 and the difference between the "sample beam" and the "reference beam."

Figure 15:
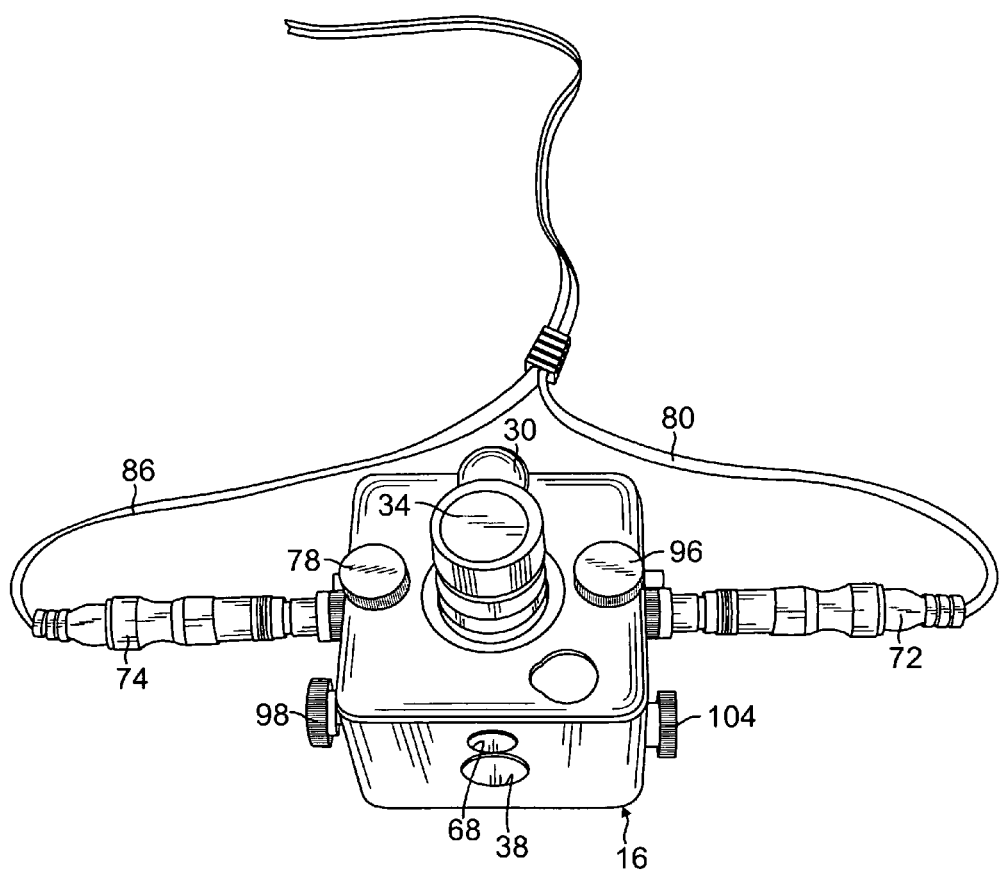
FIG. 15 is a perspective view of the spectrophotometer head used to measure transmission and scatter.
Figure 16:
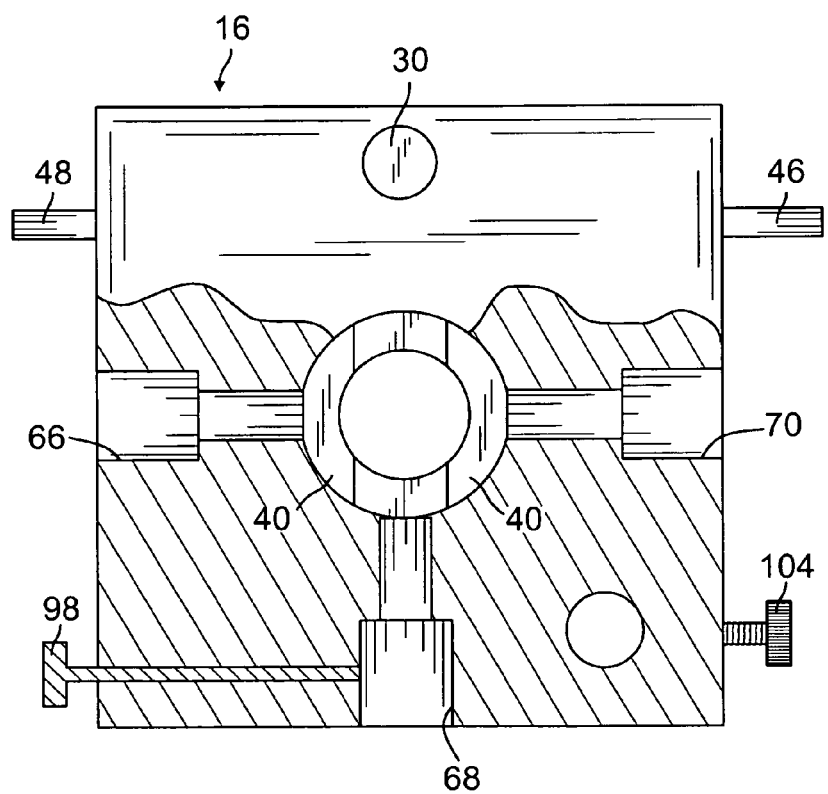
FIG. 16 is a partial cross sectional view taken along the line 16-16 in FIG. 5.

The spectrophotometer head 16 may also be used for analyzing the scatter characteristics of a liquid in the vial 34 as shown in FIGS. 15 and 16. The head has three stepped bores 66, 68 and 70 as shown in FIG. 16, all of which are in a single plane. The stepped bores 66 and 70 are arranged to be coaxial and the stepped bore 68 is arranged to be orthogonal to the axis of stepped bores 66 and 70. The arrangement shown in FIG. 15 shows the spectrophotometer head 16 as set up for measuring light transmission through the liquid in the vial 34. A LED light source 72 is inserted in stepped bore 70 and a light sensor 74 is inserted in stepped bore 66. A thumb screw 76 is used to secure the LED light source 72 in place and thumb screw 78 is used to secure the light sensor 74 in place.

Figure 17:
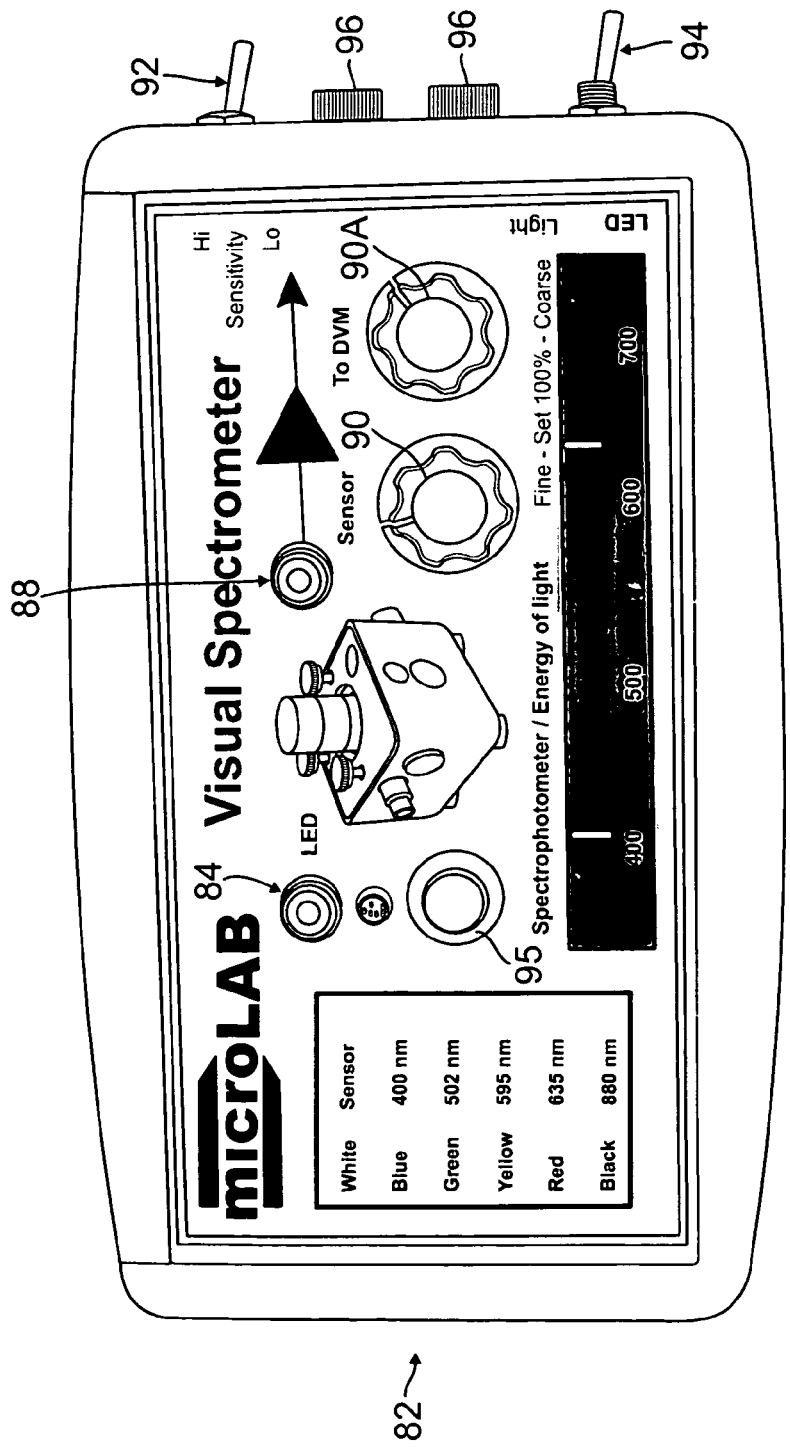
FIG. 17 is a top view of the face plate of a control instrument used with the present invention.

The LED light source 72 is connected with a cable 80 to a control instrument 82 having conventional electronics, as shown in FIG. 17 by connecting to jack 84. The light sensor 74 is connected with a cable 86 to a jack 88 provided in the instrument 79. The instrument 79 is provided with LED brightness controls, namely a fine control 90 and a coarse control 90A. Further, a sensor sensitivity hi/low switch 92 is provided. Also, a switch 94 is provided to switch between a reading of the voltage output of the light sensor 74 and a reading of the voltage applied to LED light source 72. A push button switch 95 is provided for turning on the LED. Finally, jacks 96 are provided for connecting to a digital voltmeter (not shown).

If scatter is to be measured, either the LED light source 72 or the light sensor 74 is moved and inserted into stepped bore 68. Thumb screw 98 is used to secure the selected LED light source 72 or light sensor 74 in place. In this arrangement, light transmitted through the LED light source 72 is picked up by the light sensor 74 at a direction 90° from the direction of the LED light source 72.

Figure 18:
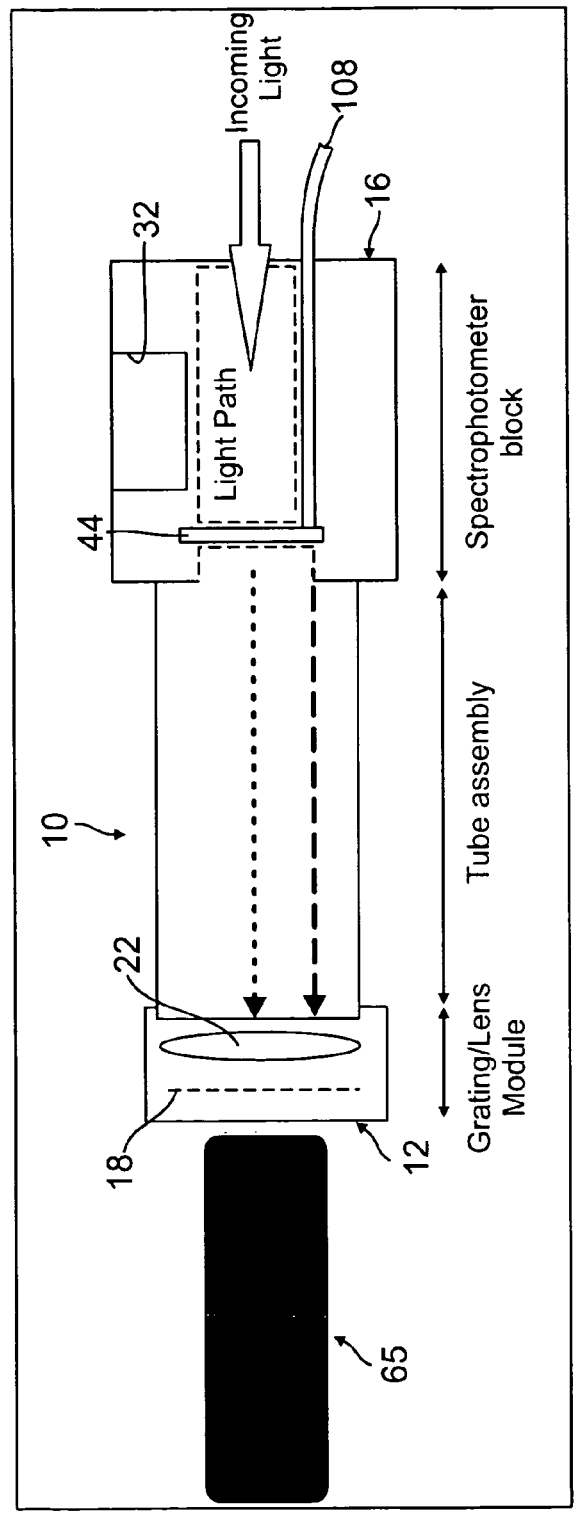
FIG. 18 is a schematic view showing the operation of the present invention when analyzing atomic emission spectra.

The visual spectrophotometer 10 may also be used for analyzing atomic emission spectra of gases. In this case the vial 34 is removed. The spectrophotometer head 16 is oriented so that light from a gaseous light source comes into the spectrophotometer 10 as shown in FIG. 18 of Exhibit A (now FIG. 18). The spectrum displayed is a line emission spectrum unique to the gas being observed.

Further with the application shown in FIG. 18, the incoming light from the gaseous source could be conventionally restricted to the upper half of the slot 42 (the "sample beam"). A calibration light source 108 such as a fiber optic cable is positioned to terminate at a slit of the multi-slit carrier 44 disposed in the light path (the "reference beam"). With this arrangement, the upper half spectrum 65 shows the line emission spectrum of the gas being analyzed and the lower half spectrum 65 shows the spectrum of the calibration light source 108.

Figure 19:
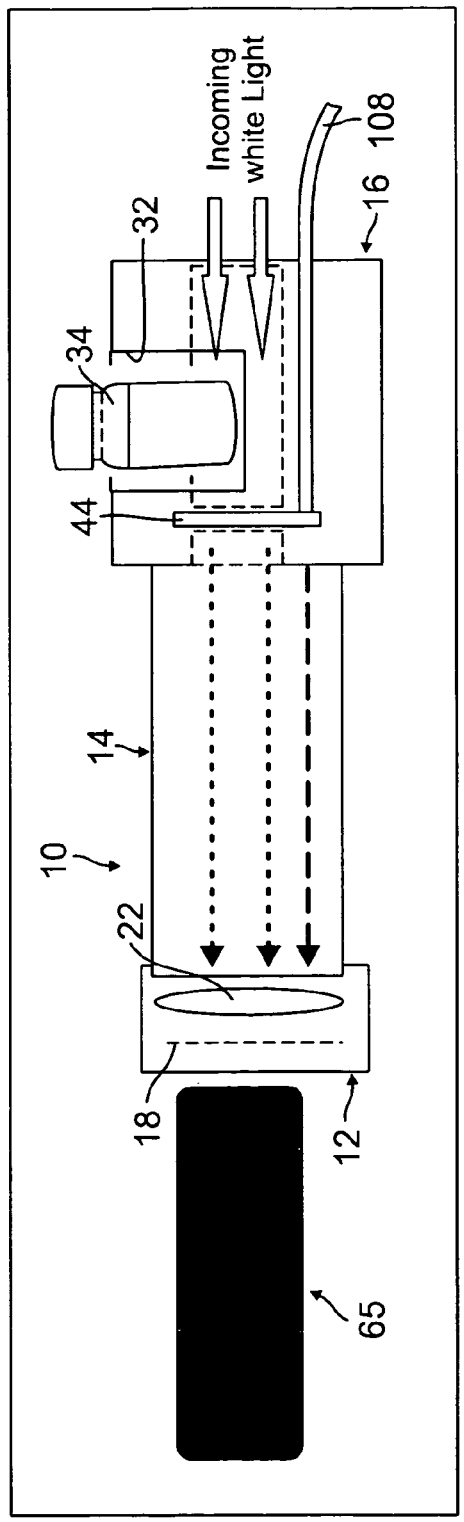
FIG. 19 is a schematic view showing the present invention according to FIG. 14 with an additional calibration light source.

A further embodiment of the present invention includes the a calibration light source 108 such as from a fiber optic cable which is introduced with the unimpeded white light transmitted underneath the vial 34 as shown in FIG. 19. The calibration light source 108 is used when producing a calibration graph of the calibration light source spectrum. This is used to calculate the wave lengths of the unknown spectrum of the "sample beam."

The spectrophotometer head 16 is also provided with a bore 100 for receiving a ring stand 102 as shown in FIG. 2. The spectrophotometer head 16 is secured to the ring stand with thumb screw 104.

The spectrophotometer head 16 is provided with feet 106 to support the spectrophotometer head 16 when resting on a table, for example.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

We claim:

1. A visual spectrophotometer for measuring molecular absorption spectra of a colored liquid comprising:

an elongate light tube having a first end and a distal second end and a longitudinal axis;

a spectrophotometer head mounted to the first end of the tube;

the spectrophotometer head having a bore therethrough for receiving incoming light from a light source;

the bore having a longitudinal axis coaxially aligned with the longitudinal axis of the light tube providing a light path through the spectrophotometer head and light tube;

a slit assembly mounted in the spectrophotometer head providing a slit disposed in the light path;

a stopped bore provided in a top wall of the spectrophotometer head extending downwardly orthogonal to the light path and stopped halfway through the light path;

a transparent vial containing colored liquid disposed within the stopped bore;

the stopped bore adapted to allow light in the light path to be transmitted through the colored liquid;

a diffraction grating head mounted to the second end of the light tube;

the diffraction grating head having a bore therethrough having a longitudinal axis coaxially aligned with the longitudinal axis of the light tube providing an extension of the light path through the diffraction grating head;

a focusing lens disposed in the light path adjacent to the light tube;

a diffraction grating disposed in the light path and spaced apart from the lens for displaying a spectrum of the light passing through the spectrophotometer head, the light tube and the diffraction grating head with an upper half displaying the spectrum of the light transmitted through the colored liquid and a lower half displaying the spectrum of the light source.

2. The spectrophotometer according to claim 1 wherein the slit assembly includes a carrier carrying multiple slits of increased width and means for aligning a selected slit with the light path.

\* \* \* \* \*

UNITED STATES PATENT AND TRADEMARK OFFICE
CERTIFICATE OF CORRECTION

Page 1 of 1

PATENT NO. : 8,638,433 B1
APPLICATION NO. : 13/573485
DATED : January 28, 2014
INVENTOR(S) : John R. Amend and Richard A. Hermens It is certified that error appears in the above-identified patent and that said Letters Patent is hereby corrected as shown below:

On the Title Page, Item (60) should be corrected as follows:

Related U.S. Application Data

(60)    Provisional application No. 61/574,000 filed on Sep. 15, 2011.

Signed and Sealed this
Twenty-fourth Day of February, 2015

Michelle K. Lee
*Deputy Director of the United States Patent and Trademark Office*